United States Patent
Heusdens

Patent Number: 5,812,219
Date of Patent: *Sep. 22, 1998

[54] SYSTEM AND METHOD FOR TRANSMITTING PICTURE OR SOUND SIGNALS

[75] Inventor: Richard Heusdens, Eindhoven, Netherlands

[73] Assignee: U.S. Philips Corporation, NY, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 551,592

[22] Filed: Nov. 1, 1995

[30] Foreign Application Priority Data

Nov. 9, 1994 [EP] European Pat. Off. .............. 9420364

[51] Int. Cl.⁶ .............. H04N 5/14; H04N 9/64; H04N 7/12; H04N 11/02
[52] U.S. Cl. .............. 348/699; 348/409
[58] Field of Search .............. 348/699, 412, 348/409, 395; H04N 5/14, 9/64, 7/12, 11/02, 11/04

[56] References Cited

U.S. PATENT DOCUMENTS

| | | |
|---|---|---|
| 5,291,281 | 3/1994 | Paik et al. .............. 348/415 |
| 5,311,310 | 5/1994 | Jozawa et al. .............. 348/699 |
| 5,428,395 | 6/1995 | Jeong .............. 348/412 |
| 5,455,874 | 10/1995 | Ormsby et al. .............. 348/395 |

OTHER PUBLICATIONS

"Lapped Transforms for Efficient Transform/Sub–Band Coding" IEEE Trans. on ASSP, vol. 38, No. 6, Jun. 1990, pp. 969–978.

"The Lot: Transform Coding Without Blocking Effects" IEEE Trans. on ASSP, Vol. 37, No. 4, Apr. 1989, pp. 553–559.

"Overlapped Transform Coding of Medical X–ray Images" M. Breeuwer, SPIE Medical Imaging 1994.

*Primary Examiner*—Tommy P. Chin
*Assistant Examiner*—Nhon T. Diep
*Attorney, Agent, or Firm*—Laurie E. Gathman

[57] ABSTRACT

Due to a reduction of block artefacts in the reconstructed signal, lapped signal transforms are more suitable than non-lapped transforms for compressing picture and sound signals. Nevertheless, the known lapped orthogonal transform is still accompanied by the artefacts. A system and method are described for transmitting picture or sound signals in which the artefacts remain absent also upon substantial compression and in which orthogonality and phase linearity of the transform is maintained. The transform matrix may be constructed from any arbitrary orthogonal K*K basis matrix C. It is indicated how the basis matrix can be obtained, for example from the DCT.

16 Claims, 6 Drawing Sheets

SYSTEM AND METHOD FOR TRANSMITTING PICTURE OR SOUND SIGNALS

BACKGROUND OF THE INVENTION

The invention relates to a system for transmitting picture or sound signals. More particularly, the invention relates to transmitting these signals by means of a lapped transform method.

In the lapped transform of a picture or sound signal, series of 2K samples of the signal halfway overlapping each other are transformed into K coefficients. The coefficients are transmitted and subsequently backward-transformed to reconstruct the picture or sound signal. The transform is described by a transform matrix. The transform matrix at the transmitter end will hereinafter be denoted by A. The transform matrix at the receiver end will hereinafter be denoted by S. The matrices A and S have a dimension of K*2K (vertical*horizontal) elements. The K rows of 2K elements of the matrix S constitute the basis functions of the transform. Each basis function has a frequency spectrum. The basis functions are chosen to be such that each basis function comprises a part of the total frequency spectrum. As the central frequency of that part is higher, the basis function is said to have a higher order. For example, in picture transforms an increasing order represents an increasing extent of picture detail.

Signal transforms are often used for digital compression of picture and sound signals. Compression is possible because coefficients of a higher order are often coarsely quantized or may even be omitted. It is important that the basis functions of the transform are chosen carefully. A very frequently used transform method for compressing video pictures is the Discrete Cosine Transform (DCT). This is a non-lapped transform whose matrix consists alternately of even and odd basis functions of an increasing order.

A known lapped transform method is published in "Lapped Transforms for Efficient Transform/Sub-band Coding", IEEE Trans. on ASSP, vol. 38, no. 6, June 1990, pp. 969–978. The transform matrices A and S are derived from the non-lapped DCT. They comprise half a number of even rows and half a number of odd rows. The even rows are obtained by pair-wise forming the difference of an even row and the subsequent odd row of the DCT matrix and by repeating said difference in a mirrored fashion. The odd rows are obtained by repeating the same difference negatively and in a mirrored fashion. The matrices may thus be mathematically written as:

$$A, S = \begin{bmatrix} I & O \\ O & T \end{bmatrix} \times \begin{bmatrix} C_e + C_o & (C_e + C_o) \cdot J \\ C_e + C_o & -(C_e + C_o) \cdot J \end{bmatrix} \quad (1)$$

In this formula, I is the unit matrix, O is the zero matrix and J is the counter-identity matrix. $C_e$ and $C_o$ are ½K*K matrices in which the even and odd rows of a matrix C are accommodated. T is a matrix which ensures that the odd rows do not show large discontinuities. The rows of C are denoted by $c_j$, in which the index j represents the order of the relevant basis function. An even index j also indicates that the basis function is even. An odd index j indicates that the basis function is odd.

In accordance with the state of the art, the K*K matrix C is constituted by the DCT matrix. The state of the art thus indicates a method of constructing a lapped transform from the non-lapped DCT. The DCT matrix functions, as it were, as a "basis matrix" for the construction of A and S. The lapped transform obtained is orthogonal. The transform is therefore also referred to as LOT (Lapped Orthogonal Transform). Orthogonality is a desired property in signal transforms due to the preservation of energy and because the transmission system is then well-conditioned. This is understood to mean that the system behaves in a numerically stable way. Moreover, in orthogonal transforms, the backward transform matrix S is identical to the transmitter matrix A. The known lapped transform is also phase-linear. Phase linearity means that the delay time of the transmission system is the same for all picture or sound frequencies.

However, the known LOT has the drawback that discontinuities occur at the edges of each series of samples of the output signal when the coefficients are quantized for compression (i.e. data reduction). In picture coding, in which the picture is divided into 2-dimensional blocks, these errors become manifest as visible luminance discontinuities at the edges of each block. These discontinuities are therefore also referred to as block artefacts.

SUMMARY OF THE INVENTION

It is an object of the invention to provide a system for transmitting picture and sound signals in which said artefacts are substantially absent.

To this end the system according to the invention is characterized in that the basis matrix C is orthogonal and in that the elements $c_{2i,k}$ of the even basis functions and the elements $C_{2i+1,k}$ (k=0, 1, ... ) of the odd basis functions $c_{2i+1}$, for at least the lowest order (i=0) comply with:

$$0 \leq |c_{2i,0} + c_{2i+1,0}| \leq |c_{2i,1} + c_{2i+1,1}|$$

The invention is based on the recognition that an orthogonal lapped transform matrix can be constructed from any arbitrary orthogonal K*K basis matrix C. It is achieved by means of a basis matrix complying with the imposed requirements that at least the lowest order basis function of the lapped transform at both edges tends to the value of zero. Since the output signal is a weighted sum of basis functions and the lowest order basis function is the most significant, discontinuities are now substantially absent.

It is to be noted that it is known per se to scale at least the first even row or the first odd row of the DCT matrix in such a way that their difference converges towards the value of zero. However, the lapped transform thus obtained, referred to as Modified Lapped Transform (MLT), is no longer orthogonal.

A further embodiment of the system according to the invention is characterized in that the elements $c_{2i,k}$ of the even basis functions $c_{2i}$ and the elements $c_{2i+1,k}$ of the odd basis functions $c_{2i+1}$ pair-wise comply with:

$$0 \leq |c_{2i,0} + c_{2i+1,0}| \leq |c_{2i,1} + c_{2i+1,1}|$$

It is thereby achieved that all basis functions of the lapped transform at the edges tend towards zero. Block artefacts now remain completely absent. Moreover, the basis functions of the lapped transform have an increasing order. At a suitable choice of C, this results in good frequency-discriminating properties. The lapped transform is then extremely suitable for a substantial compression of picture and sound signals.

A particularly favourable embodiment of the system is characterized in that all elements $c_{0,k}$ of the even basis function $c_0$ of the lowest order have the same value. Series of samples of equal value, for example picture blocks of uniform brightness, can then be transmitted with one coefficient only.

These and other aspects of the invention will be apparent from and elucidated with reference to the embodiments described hereinafter.

DETAILED DESCRIPTION OF THE PREFERRED EMBODIMENTS

Figure 1:
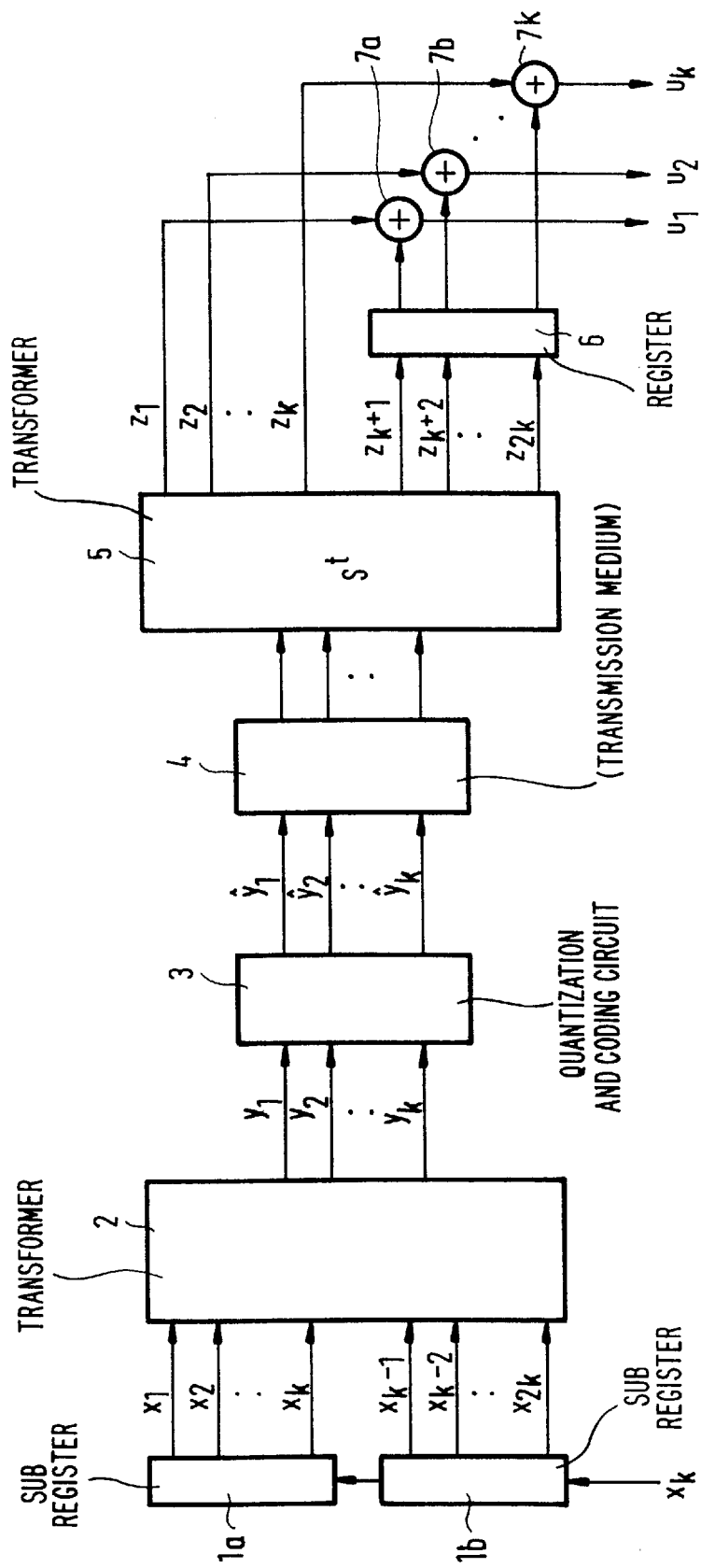
FIGS. 1 and 2 show embodiments of a system for transmitting picture or sound signals according to the invention.

FIG. 1 shows a first embodiment of a system for transmitting picture or sound signals according to the invention. The device comprises a shift register 1a, 1b for series-parallel conversion of successive samples $x_k$ of an input signal. The shift register comprises 2K elements and is shown in the form of two sub-registers 1a and 1b of K elements so as to indicate that the input signal after each transform of 2K samples is shifted over a length of K samples. The 2K available samples are denoted by $x_1 \ldots x_{2K}$. They are applied to a transformer 2 in which the vector $\{x_1 \ldots x_{2K}\}$ is multiplied by a K*2K transform matrix. This matrix will further be referred to as the analysis matrix A. Each transform of 2K input samples yields K coefficients $y_1 \ldots y_K$. They are applied to a quantization and coding circuit 3 and subsequently transmitted via a transmission medium 4. The transmission medium may be a radio or cable connection, but also a storage medium such as a magnetic tape or optical disc. At the receiver end, the quantized coefficients $\hat{y}_1 \ldots \hat{y}_k$ are applied to a transformer 5. This transformer multiplies each series $\{\hat{y}_1 \ldots \hat{y}_K\}$ of K coefficients by a 2K*K matrix $S^t$. The matrix $S^t$ is the transposed version of a K*2K matrix S which will further be referred to as the synthesis matrix S. The transform of the K coefficients yield 2K numbers $z_1 \ldots z_{2K}$. These are summed in an overlapping manner. This is shown in the Figure by means of adders 7a . . . 7k in which each time K numbers $z_1 \ldots z_K$ are added to K numbers $z_{K+1} \ldots z_{2K}$ from the preceding series. To this end, the relevant part of the preceding series is stored in a register 5. The samples $u_1 \ldots u_K$ of the reconstructed picture or sound signal are available at the output of adders 7a . . . 7k.

Figure 2:
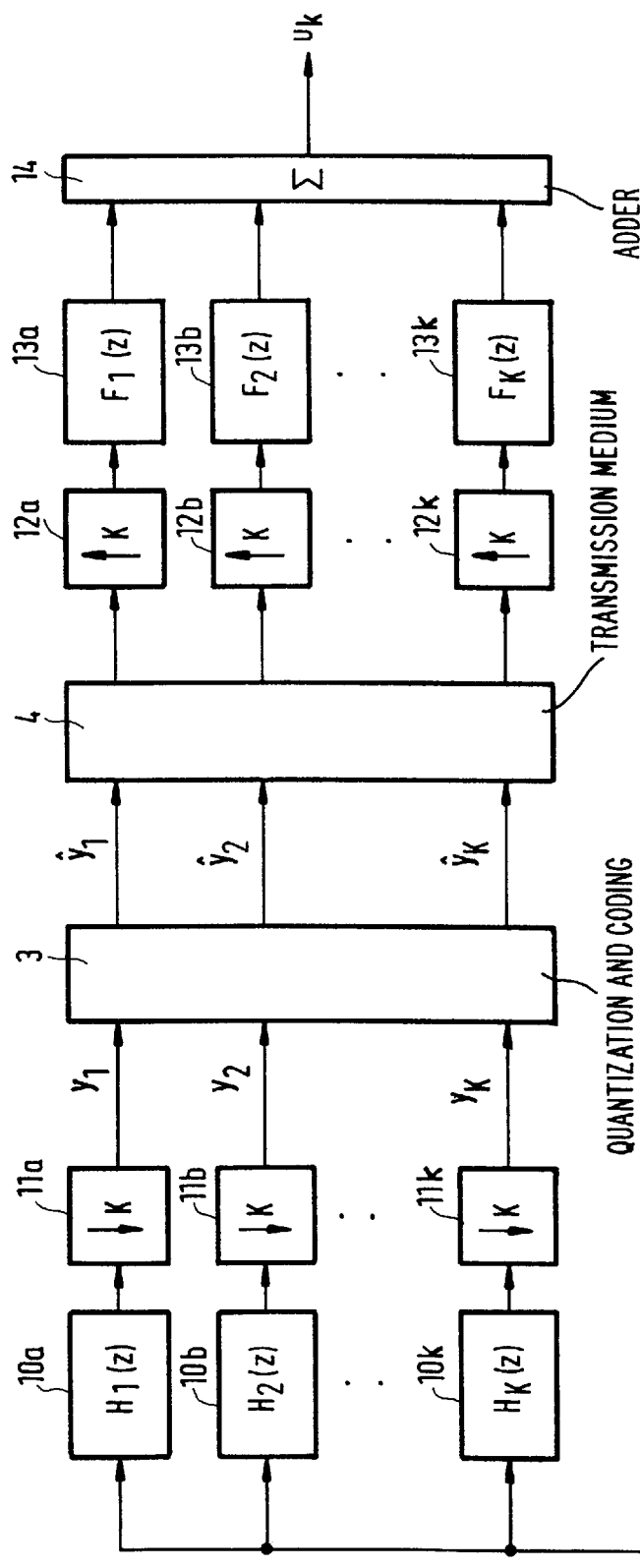

Nowadays it is realised that a signal transform may essentially be considered as a special case of multirate filter bank coding. Such a multirate filter bank is shown in FIG. 2 as a second embodiment of a system according to the invention. The filter bank comprises K filters 10a . . . 10k having a filter length 2K and a transfer function $H_k(z)$. The filtered signals are decimated by a factor K in down-samplers 11a . . . 11k. This is generally referred to as critical sampling. It means that only each Kth sample of the filtered signals is transmitted while the intermediate K-1 samples are ignored. Each transmitted sample represents a coefficient $y_k$. After quantization and transmission, the K signals are up-sampled (filling in the K-1 intermediate samples of the value zero) in up-samplers 12a . . . 12k. Subsequently, they are applied to K interpolation filters 13a . . . 13k having a filter length 2K and a transfer function $F_k(z)$. The interpolated signals are subsequently summed in an adder 14.

The analogy between transform (FIG. 1) and multirate filter bank coding (FIG. 2) provides the possibility of gaining an insight into some aspects of the invention. For example, the K pulse responses having a length 2K of the interpolation filters $F_k(z)$ correspond to the K rows of the K*2K transformer S, and the K pulse responses having a length 2K of the filters $H_K(z)$ correspond to the rows of the matrix A which are reversed in order.

To understand the embodiments, signal transforms in general will be elucidated first. In principle, the picture or sound signal x to be transmitted comprises an infinite number of samples $x_k$. Due to the forward transform at the transmitter end of the circuit, it is converted into an equally large number of coefficients $y_k$. These coefficients are backward-transformed at the receiver end. The forward and backward transforms are laid down in a transform matrix. The transform matrix at the transmitter end will be denoted by T and at the receiver end by P. In a mathematical notation, the forward transform is described by y=Tx. The backward transform is described by $u=P^t y$, in which $P^t$ is the transposed version of P (transposition is the exchange of rows and columns). If the matrix P is written in the form of $$P = \begin{bmatrix} p_{11} & p_{12} & \ldots \\ p_{21} & p_{22} & \ldots \\ \ldots & \ldots & \ldots \end{bmatrix}$$

then the backward transformation $$u = P^t y = \begin{bmatrix} p_{11} & p_{12} & \ldots \\ p_{21} & p_{22} & \ldots \\ \ldots & \ldots & \ldots \end{bmatrix} \times y$$

can be written as:

$$\begin{bmatrix} u_1 \\ u_2 \\ \ldots \end{bmatrix} = \begin{bmatrix} p_{11} \\ p_{12} \\ \ldots \end{bmatrix} \times y_1 + \begin{bmatrix} p_{21} \\ p_{22} \\ \ldots \end{bmatrix} \times y_2 + \ldots$$

This vector notation shows that the output signal $\{u_1, u_2 \ldots\}$ can be considered to be a linear combination of vectors $\{p_{11}, p_{12}, \ldots\}$, $\{p_{21}, p_{22}, \ldots\}$, etc. with weighting factors $y_1, y_2 \ldots$ Said vectors are constituted by the columns of $P^t$, i.e. the rows of matrix P. They are referred to as the basis functions of transformer P. The weighting factors $y_1, y_2, \ldots$ are the coefficients obtained from the forward transform.

We will now concentrate on separable transforms. This means that 2-dimensional transforms (for example, of video pictures) can be performed by performing a 1-dimensional transform in the horizontal direction and subsequently in the vertical direction. The following description may therefore be limited to 1-dimensional transforms.

The matrices T and P are square and, in principle, infinitely large. In practical uses, for example in picture and sound coding, the input signal x is split up into 1-dimensional series (sound) or 2-dimensional blocks (picture) with a limited number of samples. Each series or block is subjected to the same transform. For example, in picture coding it is conventional practice to transform blocks of 8*8, 16*16 or 32*32 pixels. Due to this division, the matrices T and P acquire a block-Toeplitz structure which can be mathematically written as follows:

$$T = \begin{bmatrix} \cdot & & \\ & A & \\ & & A \\ & & & \cdot \end{bmatrix} \text{ and } P = \begin{bmatrix} \cdot & & \\ & S & \\ & & S \\ & & & \cdot \end{bmatrix} \quad (2)$$

in which A (analysis) and S (synthesis) are the matrices of finite dimensions shown in FIG. 1. The rows of P correspond to the rows of S, supplemented with zeroes on either side. The basis functions of the transform are thus only unequal to zero in a limited range. The matrices A and S in equation (2) may or may not overlap each other. The frequently used DCT (inter alia, in MPEG picture coding) belongs to the class of non-lapped transforms. Here, each time K samples $\{x_1 \ldots x_K\}$ are transformed into N coefficients $\{y_1 \ldots y_K\}$ by means of a K*K matrix A.

For data compression of video pictures, the basis functions are chosen to be such that each of them is representative of a given extent of picture detail. In terms of the multirate filter bank: each filter $H_k(z)$ filters a limited band from the frequency spectrum. As the filter frequency is higher, the pulse response has a higher order. Since the human eye is less sensitive to the higher spatial frequencies, the corresponding coefficients can be quantized in a coarser manner. Picture planes of uniform brightness can even be described by means of one coefficient.

Quantization of the coefficients implies that the input signal is no longer transmitted faultlessly. This may be formulated mathematically by assuming that each coefficient $y_k$ is beset with a quantization error $e_k$. Instead of the exact coefficients y, quantized coefficients $\hat{y}=y+e$ are transmitted. The output signal u of the transmission circuit then is:

$$u=P^t\hat{y}=P^t(y+e)=P^ty+P^te=x+P^te$$

Figure 3:
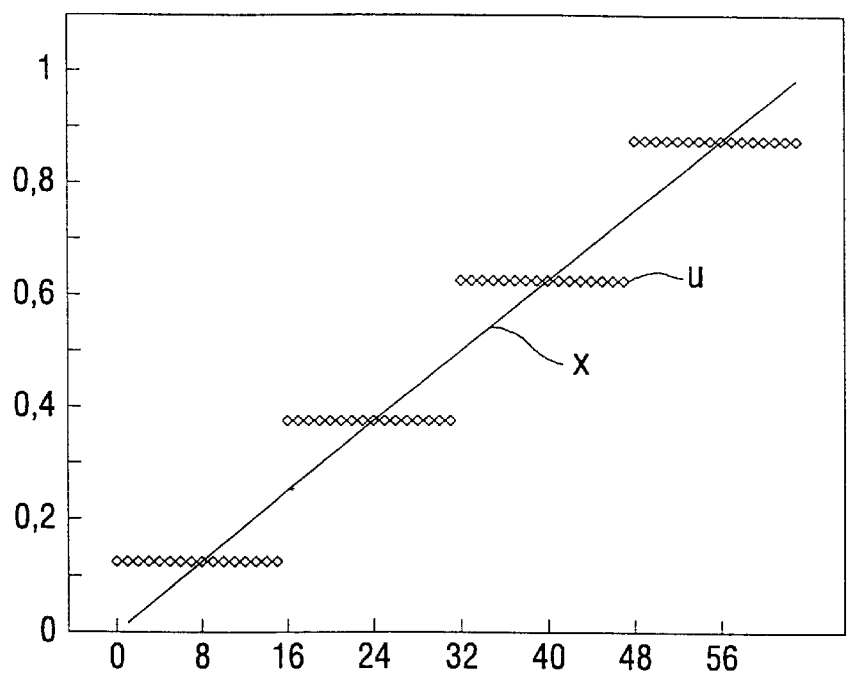
FIG. 3 shows block artefacts as occur in non-lapped transforms.

In other words, the reconstructed output signal u not only comprises the exact input signal x but also an error signal $P^te$. Said error signal is also a linear combination of the basis functions of P, now with $e=\{e_1,e_2,\ldots\}$ as weighting factors. Noticeable artefacts are produced at high compression factors, i.e. at large values of $e_k$ by coarse quantization, or even omission of coefficients of higher order basis functions. In non-lapped transforms, these artefacts become rapidly manifest at the edges of each series of samples. For example, in picture coding, luminance discontinuities occur at the edge of each block of pixels. FIG. 3 shows an example of this. In this example, x represents an input signal in the form of a linearly increasing picture brightness which is subjected to a 16*16 DCT. It will be readily evident that when omitting all coefficients, except that of the lowest order (the DC coefficient), a step-wise increasing output signal u will be obtained, whose discontinuities coincide with the edges of each series of pixels.

In lapped transforms, the matrices A and S overlap each other partly in the Toeplitz structure. This overlap may be expressed by writing the Toeplitz structure as:

$$T = \begin{bmatrix} A_1 & A_2 & \ldots & \\ & A_1 & A_2 & \ldots \\ & & A_1 & A_2 \\ & & & A_1 \end{bmatrix} \text{ and } P = \begin{bmatrix} S_1 & S_2 & \ldots & \\ & S_1 & S_2 & \ldots \\ & & S_1 & S_2 \\ & & & S_1 \end{bmatrix}$$

in which $$A = [A_1 A_2 \ldots] = \begin{bmatrix} a_{11} \ldots a_{1N} \\ a_{K1} \ldots a_{KN} \end{bmatrix}$$

and $$S = [S_1 S_2 \ldots] = \begin{bmatrix} s_{11} \ldots s_{1N} \\ s_{K1} \ldots s_{KN} \end{bmatrix}$$

are now rectangular K*N (vertical*horizontal) matrices. $A_1, A_2, \ldots$ and $S_1, S_2, \ldots$ are K*K matrices.

Due to the lapped transform, a series of N samples $\{x_1 \ldots x_N\}$ is transformed into a series of K coefficients $\{y_1 \ldots y_K\}$. After each transform, the input signal shifts by K samples. Similarly as in the non-lapped transform, the total number of coefficients remains equal to the total number of samples.

The backward transform $u=P^t y$ can be written as:

$$u = P^t y = \begin{bmatrix} S_1^t & & & \\ S_2^t & S_1^t & & \\ \ldots & S_2^t & S_1^t & \\ & \ldots & S_2^t & S_1^t \end{bmatrix} \times y$$

The output signal is again a sum of weighted (and now overlapping) basis functions. The basis functions are constituted by the rows $\{s_{11} \ldots s_{1N}\} \ldots \{s_{K1} \ldots s_{KN}\}$ of the matrix S, while the coefficients y again constitute the weighting factors.

We will now search for practically usable lapped signal transforms, for example for picture coding. To this end, a number of sensible limitations and requirements will be imposed on the transmission chain and these will be translated into conditions with which the transformers A and S should comply.

The following description will be based on a 50% overlap. Successive series of N=2K samples x thus overlap each other halfway. Each series of 2K samples yields K coefficients y to be transmitted. The matrices A and S have a dimension of K*2K (vertical*horizontal) elements and can be considered as a succession of two K*K matrices:

$$A=[A_1 A_2] \text{ and } S=[S_1 S_2]$$

The analysis filters $H_k(z)$ and synthesis filters $F_k(z)$ in FIG. 2 may be required to have a linear phase variation. The delay time of the signals through each K filter is then equal. To this end, half of the pulse responses of the filters should be even and half of them should be odd. As already stated, the pulse responses correspond to the rows of A and S. If the even and odd rows are grouped together, then A and S both have the following structure:

$$A, S = \begin{bmatrix} \text{even rows} \\ \text{odd rows} \end{bmatrix}$$

This property can be mathematically written as:

$$A = [A_1 A_2] = \begin{bmatrix} A_{11} & A_{11} \cdot J \\ A_{21} & -A_{21} \cdot J \end{bmatrix} \quad (3)$$

and $$S = [S_1 S_2] = \begin{bmatrix} S_{11} & S_{11} \cdot J \\ S_{21} & -S_{21} \cdot J \end{bmatrix}$$

Here, $A_{11}, A_{21}, S_{11}$ and $S_{21}$ are ½K*K matrices, J is the counter-identity matrix whose elements on the antidiagonal have the value 1 and the other elements have the value zero. The multiplication of a matrix by J causes mirroring of the rows.

An important requirement with respect to lapped transform is a perfect reconstruction of the input signal x. To this end it is necessary that $u=P^T Tx$, hence $P^T T=I$. Since P and T are square matrices, it is necessary that $TP^t = I$. Given the Toeplitz structure of $P^t$ and T, $TP^t$ can be written as:

$$T \times P^t = \begin{bmatrix} A_2 S_2{}^t + A_1 S_1{}^t & A_2 S_1{}^t & O & O \\ A_1 S_2{}^t & A_1 S_2{}^t + A_2 S_1{}^t & A_2 S_1{}^t & O \\ O & A_1 S_2{}^t & A_1 S_2{}^t + A_2 S_1{}^t & A_2 S_1{}^t \\ O & O & A_1 S_2{}^t & A_1 S_2{}^t + A_2 S_1{}^t \end{bmatrix}$$

A sufficient and necessary condition for perfect reconstruction therefore is:

$$A_1 S_1{}^t + A_2 S_2{}^t = I$$
$$A_2 S_1{}^t = A_1 S_2{}^t = O$$

Since A and S in formula (3) have the same structure, these conditions can be written as:

$$A_{11} S_{11}{}^t = A_{21} S_{21}{}^t = \tfrac{1}{2} I \quad (4)$$
$$A_{11} J S_{11}{}^t = A_{11} J S_{21}{}^t = A_{21} J S_{11}{}^t = A_{21} J S_{21}{}^t = O \quad (5)$$

Since the matrices $A_{11}$ and $A_{21}$ have the same rank (½K), the vectors of $A_{11}$ and $A_{21}$ should subtend the same space. The rows of $A_{21}$ can therefore be written as a linear combination of the rows of $A_{11}$, and conversely. Mathematically, this means that $A_{21} = T_a \cdot A_{11}$, in which $T_a$ is an arbitrary invertible ½K*½K matrix. The same considerations apply to the synthesis matrix S. Formula (3) can now be written as:

$$A = \begin{bmatrix} I & O \\ O & T_a \end{bmatrix} \times \begin{bmatrix} A_{11} & A_{11} \cdot J \\ A_{11} & -A_{11} \cdot J \end{bmatrix} \quad (6)$$

and $$S = \begin{bmatrix} I & O \\ O & T_s \end{bmatrix} \times \begin{bmatrix} S_{11} & S_{11} \cdot J \\ S_{11} & -S_{11} \cdot J \end{bmatrix}$$

By means of $T_a$ and $T_s$, the filters are formed in such a way that they have a desired behaviour with respect to "smoothness", frequency discrimination and the like. Particularly, $T_a$ and $T_s$ cause the odd pulse responses in the centre to pass "smoothly" through zero. They are completely arbitrary, provided that they are invertible. The matrices $T_a$ and $T_s$ are not independent of each other. It can be derived from condition (5) that $T_a T_s{}^t = I$, hence $T_s = T_a{}^{-t}$.

The K*2K transform matrices A and S can thus be composed from a ½K*K matrix $A_{11}$ and $S_{11}$, respectively.

Similarly as each row can be written as the sum of an even row and an odd row by means of a Fourier development, $A_{11}$ and $S_{11}$ can be written as the sum of an even matrix $A_e$ and $S_e$ of even rows, and an odd matrix $A_o$ and $S_o$ of odd rows, respectively. Formula (6) will then be:

$$A = \begin{bmatrix} I & O \\ O & T_a \end{bmatrix} \begin{bmatrix} A_e + A_o & (A_e + A_o) \cdot J \\ A_e + A_o & -(A_e + A_o) \cdot J \end{bmatrix} \quad (7)$$

and $$S = \begin{bmatrix} I & O \\ O & T_a^{-t} \end{bmatrix} \begin{bmatrix} S_e + S_o & (S_e + S_o) \cdot J \\ S_e + S_o & -(S_e + S_o) \cdot J \end{bmatrix}$$

The conditions (4) and (5) for perfect reconstruction then change into:

$$A_e S_e{}^t = A_o S_o{}^t = \tfrac{1}{4} I \quad (8)$$

The forward transform A and the backward transform $S^t$ are required to be orthogonal. The analysis matrix A and the synthesis matrix S are then equal to each other. Both of them are expressed as follows:

$$A, S = \begin{bmatrix} I & O \\ O & T \end{bmatrix} \times \begin{bmatrix} C_e + C_o & (C_e + C_o) \cdot J \\ C_e + C_o & -(C_e + C_o) \cdot J \end{bmatrix} \quad (9)$$

It follows from the foregoing that A and S can be constructed from a ½K*K matrix $C_e$ which consists of even rows and a ½K*K matrix $C_o$ which consists of odd rows. In other words: a lapped orthogonal transform (LOT) can be reconstructed from an orthogonal K*K matrix C, half of which consists of even rows and the other half consists of odd rows. The even rows of C are then incorporated in $C_e$ and scaled with a factor ½. The odd rows of C are incorporated in $C_o$ and are also scaled with a factor ½. The orthogonal matrix C is here referred to as the "basis matrix".

Figure 4:
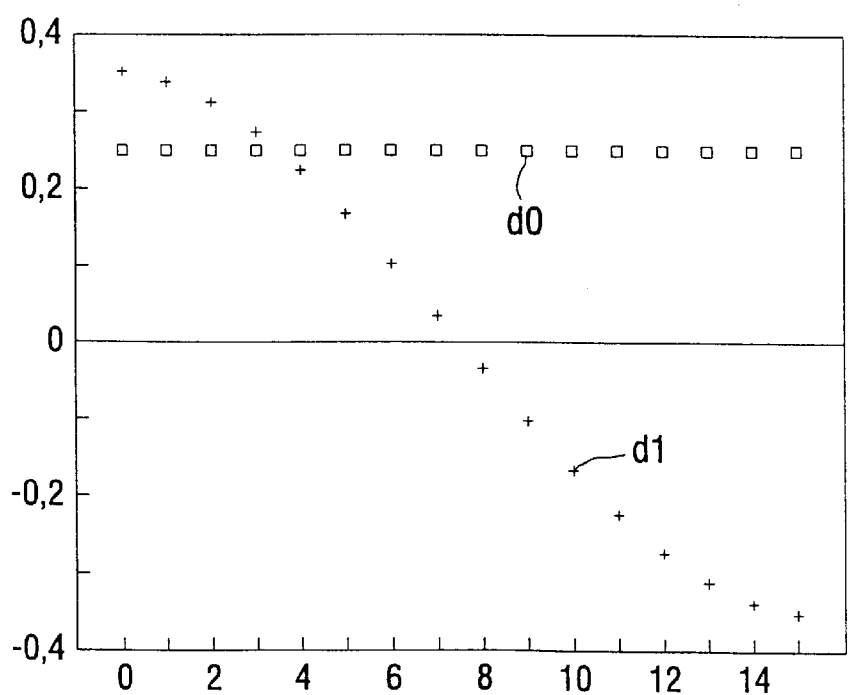
FIG. 4 shows the two first basis functions of the non-lapped DCT.
Figure 5:
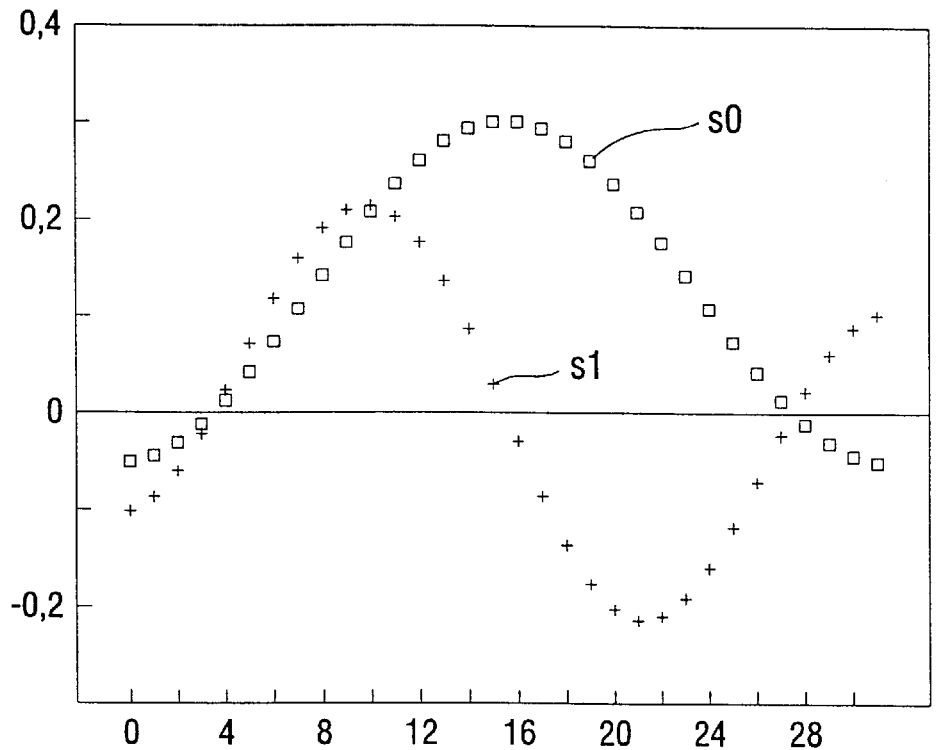
FIG. 5 shows the first two basis functions of the LOT in accordance with the prior art.

In the past, research was only done into the applicability of the DCT as a basis matrix for lapped transform. To this end, reference is made to the article mentioned in the opening paragraph, and to "The LOT: Transform Coding Without Blocking Effects" in IEEE Trans. on ASSP, vol. 37, no. 4, April 1989, pp. 553–559. It is sensible to subject the known LOT on the basis of the DCT to a further consideration. Said publications use the following formula:

$$P = \tfrac{1}{2} \times \begin{bmatrix} D_e - D_o & D_e - D_o \\ J(D_e - D_o) & -J(D_e - D_o) \end{bmatrix} \times \begin{bmatrix} I & O \\ O & Z' \end{bmatrix} \quad (10)$$

in which $D_e$ and $D_o$ comprise the even and odd basis functions of the DCT matrix. Formula (10) is comparable with the transposed version of formula (9). The two basis functions $d_0$ and $d_1$ of the lowest order (the lowest spatial picture frequencies in picture coding) of a 16:16 DCT matrix are shown in FIG. 4. Here, $d_0$ is the first even row of the DCT (the first row of $D_e$) and $d_1$ is the second row of the DCT (the first row of $D_o$). The first basis function of the LOT formed therefrom is obtained in accordance with formula (10) by forming the difference $d_0 - d_1$ and repeating this in a mirrored way so that an even basis function of 32 samples is obtained. This first basis function is denoted by $s_0$ in FIG. 5. The first odd basis function of the known LOT is obtained by forming the difference $d_0 - d_1$, performing the multiplication by elements of the matrix Z' and repeating the result antisymmetrically. It should be noted that without multiplication by Z', discontinuities would occur in this odd basis function. Such a discontinuous basis function is undesirable. The multiplication by Z' aims at preventing these discontinuities. The first odd basis function thus obtained is denoted by $s_1$ in FIG. 5.

In a corresponding manner, the second even basis function $s_2$ and second odd basis function $s_3$ of the known LOT are obtained from the third (even) row $d_2$ and fourth (odd) row $d_3$ of the DCT. These and further basis functions of the known LOT are not shown in FIG. 5.

Figure 6:
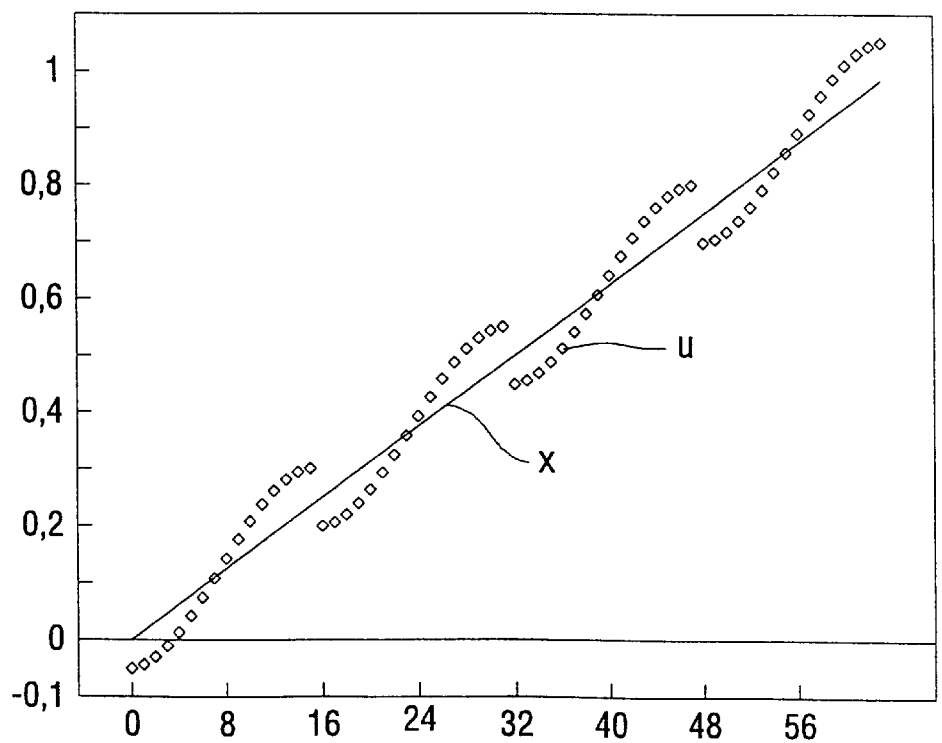
FIG. 6 shows block artefacts as occur in the known LOT.

The known LOT has the property of a perfect reconstruction. Moreover, it has the property that a series of constant input samples (for example, a picture block of constant brightness) can be transmitted by means of one DC coefficient only (the weighting factor for basis function $s_0$. However, the known LOT is not free from block artefacts. FIG. 6 shows the output signal u at a linearly increasing input signal x if only the coefficient of the first basis function is transmitted. The artefacts are produced because the first basis function $s_0$ at the edges has a value which is unequal to zero. This is caused by the fact that the "peripheral value" of the first basis function $d_0$ of the DCT basis matrix differs by a factor of $\sqrt{2}$ from the peripheral value of $d_1$. It has been tried to solve this by taking $s_0 = d_0\sqrt{2} - d_1$ instead of $s_0 = d_0 - d_1$ at least for the first basis function $s_0$. The transform obtained thereby is referred to as "Modified Lapped Transform" (MLT) and, in practice, appears to reduce the block artefacts to a considerable extent. However, the MLT is no longer orthogonal.

A method of obtaining a suitable orthogonal basis matrix C will now be described. Due to the favourable filter properties of the DCT, the DCT matrix will be the starting point. The rows of the DCT matrix, arranged according to filter frequency, are referred to as $d_0 \ldots d_K$ in which even indices indicate even rows and odd indices indicate odd rows. The rows of the basis matrix C are accordingly denoted $c_0 \ldots c_K$.

The first row $d_0$ of the DCT is taken as the first row $c_0$: $c_0 = d_0$. In fact, the row $d_0$ satisfies the desired property of all elements having the same value. This first row is denoted by $c_0$ in FIG. 7. The value of the elements is here $\sqrt{(1/K)}$ so that the norm of the row (the root of the sum of the squares) is 1.

Subsequently, $c_1$ is determined. This row should comply with the following conditions:

The elements at the left edge should go "smoothly" to $\sqrt{(1/K)}$ in order that the elements of $c_0 + c_1$ go "smoothly" to zero.

$c_1$ should be odd, i.e. it should have a zero crossing in the centre.

The norm of the row should be equal to that of the other rows. $c_1$ may largely be dimensioned intuitively. A first approximation of $-c_1$ is obtained by determining an interpolation curve of a higher order by means of some predetermined points. One or two of these points (70 in FIG. 7) are located to the left of the row and have the value $\sqrt{(1/K)}$. They cause $c_1$ at the left edge to converge "smoothly" to the desired value $\sqrt{(1/K)}$. Further points are formed by the values 72 of $d_1$ which are located on both sides of the zero crossing. The filter characteristic of $c_1$ will then not be essentially different from the favourable characteristic of the first odd row of the DCT matrix. A monotonous interpolation curve between the points determined so far would yield a row of the norm <1. To restore the norm, at least one point having a value which is larger than the peripheral value $\sqrt{(1/K)}$ (71 in FIG. 7) is determined between the left edge and the zero crossing.

Figure 7:
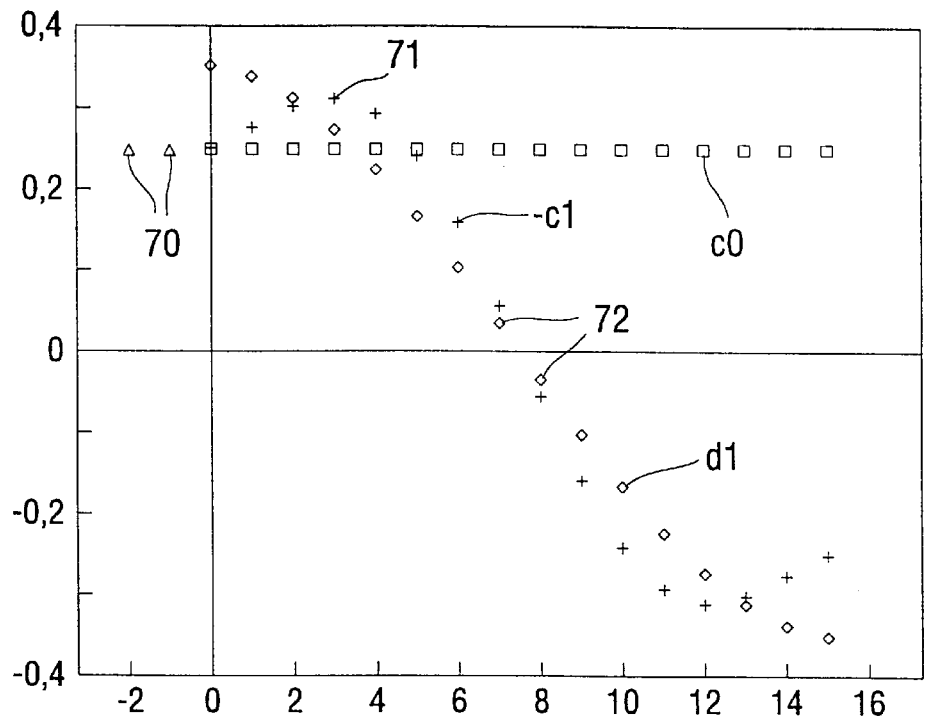
FIG. 7 illustrates the realisation of the two first basis functions of a basis matrix for constructing a LOT according to the invention.

An interpolation curve of a higher order is computed through the points thus determined. The curve obtained is a first estimation of the searched row $c_1$. The norm of this row is subsequently computed. A deviation from the desired value is corrected by correcting the obtained values by an appropriate factor. If desired, the normalization may take place in a number of iterative steps. In this way the row denoted by $-c_1$ in FIG. 7 is eventually obtained. For the purpose of comparison, the first odd row of the DCT matrix is denoted by $d_1$ in this Figure.

The further even rows $c_2, c_4, \ldots$ of the basis matrix C may be completely identical to the corresponding even rows $d_2, d_4, \ldots$ of the DCT matrix. They are already perpendicular to each other (because that is a property of the DCT) and perpendicular to all other rows (because they are odd rows).

The further odd rows $c_3, c_5, \ldots$ of the basis matrix C may also be directly derived from the corresponding rows of the DCT matrix. Their shape need not be changed and they sufficiently comply with the requirement that they should be equal at the left edge to their adjacent even row. The rows $d_3, d_5, \ldots$ of the DCT matrix are, however, not perpendicular to the row $c_1$ just constructed. Consequently, they must be successively rotated. This process of vector rotation is generally known in mathematics by the name of Gram-Schmidt orthogonalization.

Figure 8:
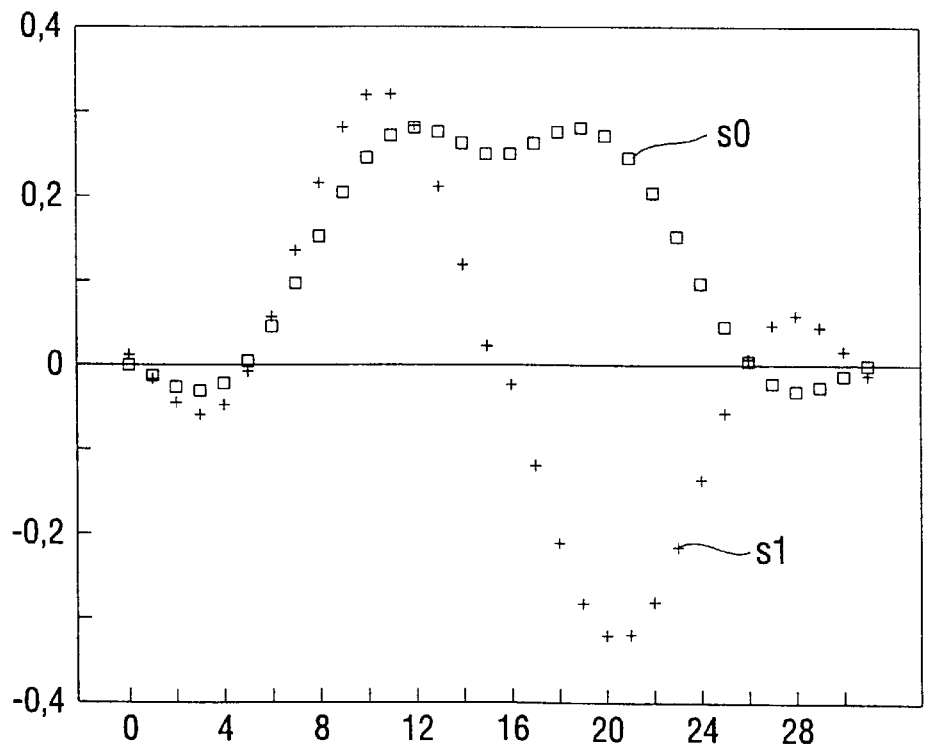
FIG. 8 shows the two first basis functions of the LOT according to the invention.
Figure 9:
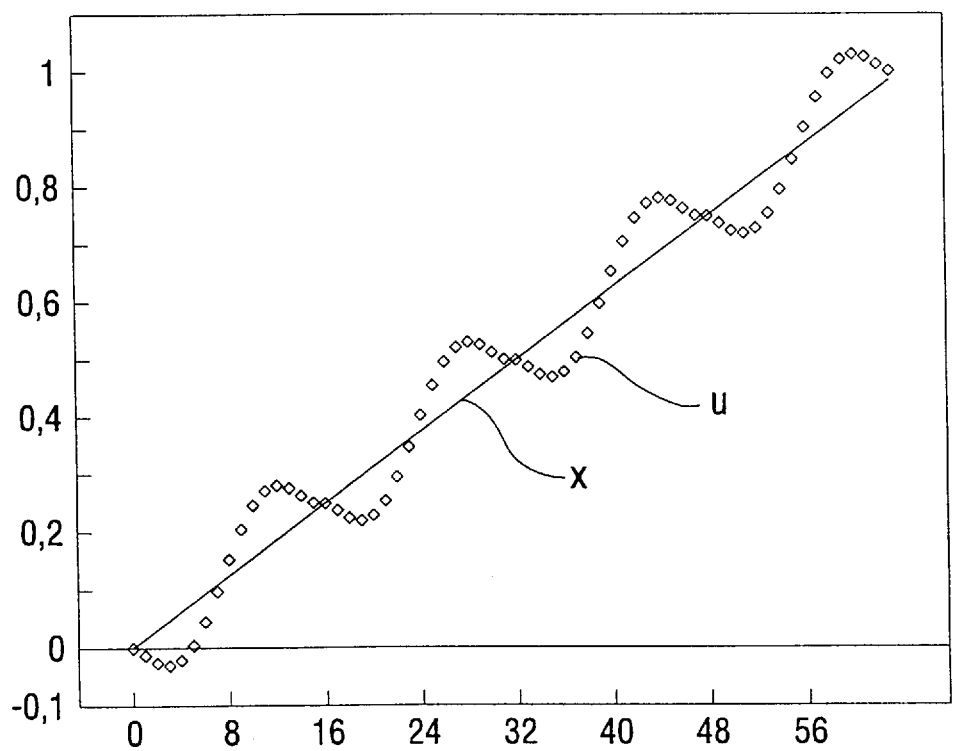
FIG. 9 shows the response of the system according to the invention to a linearly increasing input signal upon transmission of a single coefficient.

FIG. 8 shows the first even basis function $s_0$ and the first odd basis function $s_1$ of the transform matrix S as obtained from $c_0$ and $c_1$ by means of formula (9). FIG. 9 shows the output signal u at a linearly increasing input signal x if only the coefficient of the first basis function is transmitted. Block artefacts at the edges are now completely absent.

What is claimed is:

1. A system for transmitting picture or sound signals, comprising:

first transform means (2; 10, 11) for transforming series of samples of the picture or sound signal overlapping each other halfway into coefficients by means of a first transform matrix A;

means (3, 4) for transmitting the coefficients;

second transform means (5; 12, 13) for lapped backward transform of the transmitted coefficients into an output signal by means of a second transform matrix S, in which the matrices A and S can be written as:

$$A, S = \begin{bmatrix} I & O \\ O & T \end{bmatrix} \times \begin{bmatrix} C_e + C_0 & (C_e + C_0) \cdot J \\ C_e + C_0 & -(C_e + C_0) \cdot J \end{bmatrix}$$

in which I is the unit matrix, O is the zero matrix and J is the counter-identity matrix, and in which the matrices $C_e$ and $C_o$ comprise even basis functions and odd basis functions, respectively, of a basis matrix C, each basis function $c_j$ having an order j which is arranged in accordance with the central frequency of the frequency spectrum of the basis function, characterized in that the basis matrix C is orthogonal and in that the elements $c_{2i,k}$ of the even basis functions $c_{2i}$ and the elements $c_{2i+1,k}$ of the odd basis functions $c_{2i+1}$ for at least the lowest order (i=0) comply with:

$$0 \leq |c_{2i,0} + c_{2i+1,0}| \leq |c_{2i,1} + c_{2i+1,1}|.$$

2. A system as claimed in claim 1, characterized in that the elements $c_{2i,k}$ of the even basis functions $c_{2i}$ and the elements $c_{2i+1,k}$ of the odd basis functions $c_{2i+1}$ pair-wise comply with:

$$0 \leq |c_{2i,0} + c_{2i+1,0}| \leq |c_{2i,1} + c_{2i+1,1}|.$$

3. A system as claimed in claim 1, characterized in that all elements $c_{0,k}$ of the even basis function $c_0$ of the lowest order have the same value.

4. A system as claimed in claim 1, characterized in that at least one element $c_{1,k}$ (71) of the odd basis function $c_1$ of the lowest order complies with:

$|c_{1,k}| > |c_{1,0}|.$

5. A coding station for coding picture or sound signals, comprising transform means for transforming series of samples of the picture or sound signal overlapping each other halfway into coefficients by means of a first transform matrix A, and means for coding the coefficients, in which the matrix A can be written as $$A = \begin{bmatrix} I & O \\ O & T \end{bmatrix} \times \begin{bmatrix} C_e + C_o & (C_e + C_o) \cdot J \\ C_e + C_o & -(C_e + C_o) \cdot J \end{bmatrix}$$

in which I is the unit matrix, O is the zero matrix and J is the counter-identity matrix, and in which the matrices $C_e$ and $C_o$ comprise even basis functions and odd basis functions, respectively, of a basis matrix C, each basis function $c_j$ having an order j which is arranged in accordance with the central frequency of the frequency spectrum of the basis function, characterized in that the basis matrix C is orthogonal and in that the elements $c_{2i,k}$ of the even basis functions $c_{2i}$ and the elements $c_{2i+1,k}$ of the odd basis functions $c_{2i+1}$ for at least the lowest order (i=0) comply with:

$0 \leq |c_{2i,0} + c_{2i+1,0}| \leq |c_{2i,1} + c_{2i+1,1}|.$

6. A coding station as claimed in claim 5, characterized in that the elements $c_{2i,k}$ of the even basis functions $c_{2i}$ and the elements $c_{2i+1,k}$ of the odd basis functions $c_{2i+1}$ pair-wise comply with:

$0 \leq |c_{2i,0} + c_{2i+1,0}| \leq |c_{2i,1} + c_{2i+1,1}|.$

7. A coding station as claimed in claim 5, characterized in that all elements $c_{0,k}$ of the even basis function $c_0$ of the lowest order have the same value.

8. A system as claimed in claim 5, characterized in that at least one element $c_{1,k}$ (71) of the odd basis function $c_1$ of the lowest order complies with:

$|c_{1,k}| > |c_{1,0}|.$

9. A decoding station for decoding picture or sound signals transmitted in the form of coefficients of a lapped signal transform, comprising transform means for lapped backward transform of the transmitted coefficients into an output signal by means of a transform matrix $S^t$, in which the matrix S can be written as $$S = \begin{bmatrix} I & O \\ O & T \end{bmatrix} \times \begin{bmatrix} C_e + C_o & (C_e + C_o) \cdot J \\ C_e + C_o & -(C_e + C_o) \cdot J \end{bmatrix}$$

in which I is the unit matrix, O is the zero matrix and J is the counter-identity matrix, and in which the matrices $C_e$ and $C_o$ comprise even basis functions and odd basis functions, respectively, of a basis matrix C, each basis function $c_j$ having an order j which is arranged in accordance with the central frequency of the frequency spectrum of the basis function, characterized in that the basis matrix C is orthogonal and in that the elements $c_{2i,k}$ of the even basis functions $c_{2i}$ and the elements $c_{2i+1,k}$ of the odd basis functions $c_{2i+1}$ for at least the lowest order (i=0) comply with:

$0 \leq |c_{2i,0} + c_{2i+1,0}| \leq |c_{2i,1} + c_{2i+1,1}|.$

10. A decoding station as claimed in claim 9, characterized in that the elements $c_{2i,k}$ of the even basis functions $c_{2i}$ and the elements $c_{2i+1,k}$ of the odd basis functions $c_{2i+1}$ pair-wise comply with:

$0 \leq |c_{2i,0} + c_{2i+1,0}| \leq |c_{2i,1} + c_{2i+1,1}|.$

11. A decoding station as claimed in claim 9, characterized in that all elements $c_{0,k}$ of the even basis function $c_0$ of the lowest order have the same value.

12. A decoding station as claimed in claim 9, characterized in that at least one element $c_{1,k}$ (71) of the odd basis function $c_1$ of the lowest order complies with:

$|c_{1,k}| > |c_{1,0}|.$

13. A method of transmitting picture or sound signals, comprising the steps of:

transforming series of samples of the picture or sound signal overlapping each other halfway into coefficients by means of a first transform matrix A;

transmitting the coefficients;

lapped backward transform of the transmitted coefficients into an output signal by means of a second transform matrix $S^t$, in which the matrices A and S can be written as $$A, S = \begin{bmatrix} I & O \\ O & T \end{bmatrix} \times \begin{bmatrix} C_e + C_o & (C_e + C_o) \cdot J \\ C_e + C_o & -(C_e + C_o) \cdot J \end{bmatrix}$$

in which I is the unit matrix, O is the zero matrix and J is the counter-identity matrix, and in which the matrices $C_e$ and $C_o$ comprise even basis functions and odd basis functions, respectively, of a basis matrix C, each basis function $c_j$ having an order j which is arranged in accordance with the central frequency of the frequency spectrum of the basis function, characterized in that the basis matrix C is orthogonal and in that the elements $c_{2i,k}$ of the even basis functions $c_{2i}$ and the elements $c_{2i+1,k}$ of the odd basis functions $c_{2i+1}$ for at least the lowest order (i=0) comply with:

$0 \leq |c_{2i,0} + c_{2i+1,0}| \leq |c_{2i,1} + c_{2i+1,1}|.$

14. A method as claimed in claim 13, characterized in that the elements $c_{2i,k}$ of the even basis functions $c_{2i}$ and the elements $c_{2i+1,k}$ of the odd basis functions $c_{2i+1}$ pairwise comply with:

$0 \leq |c_{2i,0} + c_{2i+1,0}| \leq |c_{2i,1} + c_{2i+1,1}|.$

15. A method as claimed in claim 13, characterized in that all elements $c_{0,k}$ of the even basis function $c_0$ of the lowest order have the same value.

16. A method as claimed in claim 13, characterized in that at least one element $c_{1,k}$ (71) of the odd basis function $c_1$ of the lowest order complies with:

$|c_{1,k}| > |c_{1,0}|.$

* * * * *